US010785631B2

(12) United States Patent
Paso et al.

(10) Patent No.: US 10,785,631 B2
(45) Date of Patent: Sep. 22, 2020

(54) NEIGHBOUR WIRELESS SENSOR NETWORK DISCOVERY MECHANISM

(71) Applicant: Oulun yliopisto, Oulun yliopisto (FI)

(72) Inventors: Tuomas Paso, Oulun Yliopisto (FI);
Jussi Haapola, Oulun Yliopisto (FI)

(73) Assignee: Oulun yliopisto, Oulun yliopisto (FI)

( * ) Notice: Subject to any disclaimer, the term of this patent is extended or adjusted under 35 U.S.C. 154(b) by 0 days.

(21) Appl. No.: 16/167,745

(22) Filed: Oct. 23, 2018

(65) Prior Publication Data
US 2019/0141513 A1    May 9, 2019

(30) Foreign Application Priority Data

Nov. 7, 2017  (FI) .................................. 20175994

(51) Int. Cl.
| H04W 4/00 | (2018.01) |
| H04W 8/00 | (2009.01) |
| H04L 12/24 | (2006.01) |
| H04W 48/16 | (2009.01) |
| H04W 48/14 | (2009.01) |
| H04W 16/14 | (2009.01) |

(Continued)

(52) U.S. Cl.
CPC ............ H04W 8/005 (2013.01); H04L 41/12 (2013.01); H04W 16/14 (2013.01); H04W 48/14 (2013.01); H04W 48/16 (2013.01); *H04W 84/12* (2013.01); *H04W 84/18* (2013.01); *H04W 88/08* (2013.01)

(58) Field of Classification Search
CPC ............... H04W 72/042; H04W 76/27; H04W 72/0453; H04L 5/0053; H04L 5/0055; H04L 5/0007
See application file for complete search history.

(56) References Cited

U.S. PATENT DOCUMENTS 8,873,520 B2   10/2014   Omeni
9,374,831 B2    6/2016   Ho
(Continued)

FOREIGN PATENT DOCUMENTS

WO       2016005716 A1     1/2016

OTHER PUBLICATIONS

European Patent Office, European Search Reported issuen in EP18201511, dated Dec. 11, 2018 (3 pages).
(Continued)

*Primary Examiner* — Atique Ahmed
(74) *Attorney, Agent, or Firm* — Berggren LLP

(57) ABSTRACT

The present invention discloses a method and a system for discovering a neighbouring network by an already operational network. The networks comprise a control channel (CCH) and a data channel (DCH), both comprising a beacon to be transmitted, respectively. The channels are predetermined and beacon formats of theft control channels (CCH) are known, and an inter-beacon-interval of the data channel (DCH) of the already operational network comprises an active period followed by an inactive period. The present invention is characterized in that the temporal lengths of the inactive periods are changed in the data channel (DCH) of the already operational network. Furthermore, the method is configured to search for a beacon of a predetermined control channel (CCH) of a neighbouring network during subsequent inactive periods of the already operational network.

14 Claims, 2 Drawing Sheets

(51) Int. Cl.
*H04W 84/18* (2009.01)
*H04W 84/12* (2009.01)
*H04W 88/08* (2009.01)

(56) References Cited

U.S. PATENT DOCUMENTS

| | | | |
|---|---|---|---|
| 9,565,692 B2 | 2/2017 | Haapola | |
| 2007/0254598 A1* | 11/2007 | Bachl | H04L 27/261 |
| | | | 455/73 |
| 2010/0260084 A1* | 10/2010 | Imamura | H04W 52/0216 |
| | | | 370/311 |
| 2010/0304706 A1* | 12/2010 | Haverty | H04K 3/45 |
| | | | 455/404.1 |
| 2012/0063395 A1* | 3/2012 | Ho | H04W 72/1215 |
| | | | 370/329 |
| 2014/0082213 A1* | 3/2014 | Jung | H04L 67/06 |
| | | | 709/235 |
| 2015/0126188 A1* | 5/2015 | Lindoff | H04W 8/005 |
| | | | 455/434 |
| 2016/0135123 A1* | 5/2016 | Soldati | H04W 76/28 |
| | | | 370/311 |
| 2017/0019906 A1* | 1/2017 | Subramani | H04W 72/082 |
| 2017/0078902 A1* | 3/2017 | Matsuo | H04W 72/02 |
| 2017/0111890 A1* | 4/2017 | Matsuo | H04L 5/0048 |
| 2017/0164422 A1 | 6/2017 | Subramani | |
| 2017/0251482 A1 | 8/2017 | Toshiba et al. | |

OTHER PUBLICATIONS

De Sanctis, Mauro et al. A collaborative coexistence mechanisms for IEEE 802.15.3 and 802.15.4 WPANs. In: PIMRC2009, Oct. 2009, 5 pages.

Finnish Patent and Registration Office, Search report for Finnish application No. 20175994, 2 pages.

LAN/MAN Standards Committee of the IEEE Computer Society, IEEE Standard for Local and metropolitan area networks—Part 15.6: Wireless Body Area Networks, Feb. 29, 2012.

Liu, Jia et al. Modeling Neighbor Discovery in Bluetooth Low Energy Networks. IEEE Communications Letters, Sep. 2012, pp. 1439-1441, vol. 16 No. 9.

Sun, Wei et al. Energy-Efficient Neighbor Discovery in Mobile Ad Hoc and Wireless Sensor Networks: A Survey, IEEE Communications Surveys & Tutorials, Q3 2014, pp. 1448-1459, vol. 16 No. 3.

Jeon, Wha Sook et al. Performance Analysis of Neighbor Discovery Process in Bluetooth Low-Energy Networks, IEEE Transactions on Vehicular Technology, Feb. 2017, pp. 1865-1871, vol. 66 No. 2.

European Telecommunications Standards Institute, Smart Body Area Network (SmartBAN); Low Complexity Medium Access Control (MAC) for SmartBAN, ETSI Technical Specification 103 325 V1.1.1, Apr. 2015, France.

European Telecommunications Standards Institute, Smart Body Area Network (SmartBAN); Enhanced Ultra-Low Power Physical Layer, ETSI Technical Specification 103 326 V1.1.1, Apr. 2015, France.

* cited by examiner

NEIGHBOUR WIRELESS SENSOR NETWORK DISCOVERY MECHANISM

PRIORITY

This application claims priority of Finland application, No. 20175994, filed on 7 Nov. 2017 the content of which is incorporated herein by reference.

FIELD OF THE INVENTION

The present invention relates to Wireless Body Area Networks (WBANs) which are defined by IEEE standard 802.15.6 and ETSI technical committee "SmartBAN" specifications of the physical (PHY) and medium access control (MAC) for packet-based short-range communications.

BACKGROUND OF THE INVENTION

The Institute of Electrical and Electronics Engineers (IEEE) standard 802.15.6 and The European Telecommunications Standards Institute (ETSI) technical committee "SmartBAN" define physical and medium access control specifications for packet-based short-range communications in wireless body area networks (WBANs). WBANs target e.g. medical and healthcare monitoring systems in the vicinity of a human body, or inside the human body.

Standard [1], i.e. IEEE standard 802.15.6-2012, "IEEE Standard for Local and metropolitan area networks—Part 15.6: Wireless Body Area Networks", IEEE Computer Society, LAN/MAN Standards Committee, Feb. 29, 2012 discloses a standard for short-range, wireless communication in the vicinity of, or inside, a human body (but not limited to humans). The communication networks use existing industrial-scientific-medical (ISM) frequency bands as well as bands approved by national medical and/or regulatory authorities. MAC frame formats, MAC functions, security services, and physical layer specifications are discussed in this standard covering Wireless Body Area Networks.

Standard [2], i.e. Smart Body Area Network (SmartBAN), "Enhanced Ultra-Low Power Physical Layer", ETSI TS 103 326 V1.1.1, April 2015 discloses ETSI specifications for ultra-low power physical layer of the SmartBANs. It further applies to short-range, wireless communication between wearable sensors or devices and the hub coordinator, and it specifies the physical layer for transmitting on the medium. Packet formats, modulation and forward error correction (FEC) algorithms are discussed.

Standard [3], i.e. Smart Body Area Network (SmartBAN), "Low Complexity Medium Access Control (MAC) for SmartBAN", ETSI TS 103 325 V1.1.1, April 2015 discloses the MAC protocol specification designed to facilitate spectrum sharing with other devices. It comprises channel structure, MAC frame formats and MAC functions and the operative frequency band is the ISM frequency band from 2.4 GHz to 2.4835 GHz.

The above three standards [1]-[3] provide merely some hints for implementing provider specific means for detection of existence and coexistence of other neighbour networks. Still, the standards do not specify actual mechanisms for their discovery. However, wireless sensor network research has identified some mechanisms for neighbour network discovery over the past years. These known mechanisms can be classified by four underlying principles: randomness, over-half occupation, rotation-resistant intersection, and coprime cycles. These principles have been discussed in W. Sun, Z. Yang, X. Zhang, Y. Liu, "Energy-Efficient Neighbor Discovery in Mobile Ad Hoc and Wireless Sensor Networks: A Survey", IEEE Communications Surveys & Tutorials, Vol. 16, No. 3, pp. 1448-1459, Third Quarter 2014.

Regarding Bluetooth Low Energy (BLE) devices, reference J. Liu, C. Chen, and Y. Ma, "Modeling neighbor discovery in Bluetooth Low Energy Networks", IEEE Communications Letters, Vol. 16, No. 9, pp. 1439-1441, September 2012 and reference W. S. Jeon, M. H. Dwijaksara, and D. G. Jeong, "Performance Analysis of Neighbor Discovery Process in Bluetooth Low-Energy Networks", IEEE Transactions on Vehicular Technology, Vol. 66, No. 2, pp. 1865-1871, February 2017 disclose a so-called precision mechanism, where the devices can operate in three different modes. These modes are advertising, scanning and initiating. However, the proposed mechanisms almost without exception focus on the case, where a new device initializes and attempts to discover an existing network.

The problem in the prior art is that there has not been an efficient and quick method to discover neighbouring wireless sensor networks by another similar network. The prior art solutions mainly focus on the situation where just a single operational network exists in the situation where neighbouring networks are desired to be found out. Star topologies have been known between the wireless networks, and also mother-child type of hierarchies (i.e. dependent hierarchies) have been known between the networks. In other words, the problem is that there has been no way of discovering any already operational WBAN network by another already operational WBAN network, so that the transmissions in these networks are not disturbed during the discovering process.

SUMMARY OF THE INVENTION

The present invention introduces a method and a system for discovering other neighbouring WBAN networks by an already working WBAN compliant network. The purpose is to provide the discovery process so that the operation of neither of these networks will be interrupted because of the discovery process itself. The discovery process can also be applied to other kinds of networks where the network performing the search and the network to be searched are mutually similar types of networks.

The first inventive aspect comprises a method for discovering a neighbouring network by an already operational network, wherein the networks comprise a control channel and a data channel, both comprising a beacon to be transmitted, respectively; channels are predetermined and beacon formats of their control channels are known; and an inter-beacon-interval of the data channel of the already operational network comprises an active period followed by an inactive period. The present invention is characterized in that the method further comprises the steps of changing the temporal lengths of the inactive periods in the data channel of the already operational network; and searching for a beacon of a predetermined control channel of a neighbouring network during subsequent inactive periods of the already operational network.

In an embodiment of the invention, the already operational network and the neighbouring network to be discovered are Wireless Body Area Networks (WBAN) according to IEEE standard 802.15.6 and/or ETSI technical committee SmartBAN specifications.

In an embodiment of the invention, the changing of the temporal lengths of the inactive periods is performed by alternating inactive period lengths between two sequences of the inactive periods.

In an embodiment of the invention, every second inactive period has a doubled temporal duration compared to each individual remaining inactive period.

In an embodiment of the invention, the searching for a beacon of a predetermined control channel is started with a timer, and moving to a next predetermined control channel when a preset value of the timer expires.

In an embodiment of the invention, ending the discovering algorithm when the pre-determined control channels have all been processed, or when an early termination command has been given after a control channel beacon of a neighbouring network has already been found.

In an embodiment of the invention, reporting a list of the discovered neighbouring control channel beacons to a higher layer entity after the discovering algorithm has ended.

In an embodiment of the invention, reporting a failure message to a higher layer entity if there are not any discovered neighbouring control channel beacons after the discovering algorithm has ended.

According to a second inventive aspect of the present invention, it discloses a system for discovering a neighbouring network by an already operational network, wherein the networks comprise a control channel and a data channel, both comprising a beacon to be transmitted, respectively; channels are predetermined and beacon formats of their control channels are known; and an inter-beacon-interval of the data channel of the already operational network comprises an active period followed by an inactive period. The system is characterized in that the system further comprises a controller configured to change the temporal lengths of the inactive periods in the data channel of the already operational network; and the controller further configured to search for a beacon of a predetermined control channel of a neighbouring network during subsequent inactive periods of the already operational network.

In an embodiment of the invention, the already operational network and the neighbouring network to be discovered are Wireless Body Area Networks (WBAN) according to IEEE standard 802.15.6 and/or ETSI technical committee SmartBAN specifications.

In an embodiment of the invention, the controller is further configured to perform the changing of the temporal lengths of the inactive periods by alternating the inactive period lengths between two sequences of the inactive periods.

In an embodiment of the invention, every second inactive period has a doubled temporal duration compared to each individual remaining inactive period.

In an embodiment of the invention, the controller is further configured to start the searching for a beacon of a predetermined control channel with a timer, and move to a next predetermined control channel when a preset value of the timer expires.

In an embodiment of the invention, the controller is further configured to end the discovering algorithm when the predetermined control channels have all been processed, or when an early termination command has been given after a control channel beacon of a neighbouring network has already been found.

In an embodiment of the invention, the controller is further configured to report a list of the discovered neighbouring control channel beacons to a higher layer entity after the discovering algorithm has ended.

In an embodiment of the invention, the controller is further configured to report a failure message to a higher layer entity if there are not any discovered neighbouring control channel beacons after the discovering algorithm has ended.

DETAILED DESCRIPTION OF THE INVENTION

Figure 1:
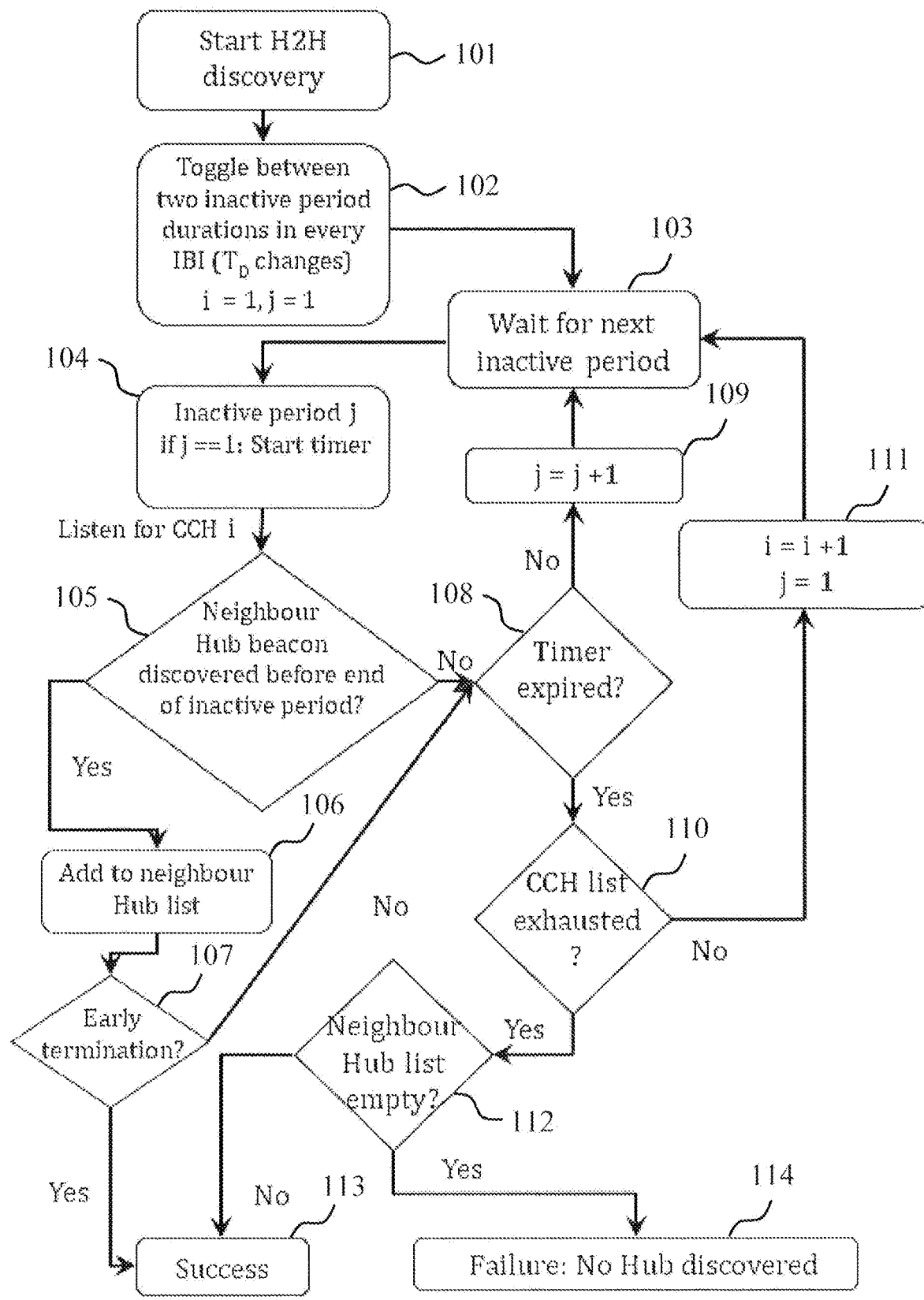
FIG. 1 illustrates a flow chart of a first embodiment of the neighbour wireless sensor network discovery process.

The present invention concentrates in wireless body area networks (WBANs). WBANs apply to e.g. medical and healthcare monitoring systems in the vicinity of a human body, inside the human body, or on or in a machine body. A WBAN can be called as a wireless network comprising wearable or mounted computing devices. The devices can be implemented inside the body tissue, on the skin, or within an implant, or as a surface-mounted device on the body in a fixed position. Some devices may also be carriable in the clothes of the user, in the user's hand, or mounted on a technological apparatus, for instance.

Low power consumption is essential for the WBAN devices. Furthermore, it is important that the used devices do not pose any biological or practical harm to the user carrying these devices.

Usually the sensors in the WBAN collect physiological changes or other information present within the patient or e.g. his/her movement, and the WBAN sensors transmit the gathered data to an external processing unit. In this manner, the doctor may physically locate anywhere and such a professional may access the data from anywhere through a cloud computation system. Certain alarms can be set and triggered if a certain measurement result gives a reason to be worried, or at least, if there is a life-threatening change in the patient's measured condition.

As already cited in the background, the standard which governs the WBANs is IEEE 802.15.6. Furthermore, the ETSI technical committee "SmartBAN" has defined physical layer and medium access control specifications for packet-based short-range communications in WBANs.

Discussing now the general facts of the SmartBAN compliant networks, such a SmartBAN network operates in two physical channels. The first physical channel is a control channel (abbreviated as CCH) and the second physical channel is a data channel (DCH). The control channel is used in initializing the network. The CCH may be a distinct logical or physical radio channel. The coordinating entity of the SmartBAN network, i.e. a Hub, transmits control channel beacons (i.e. C-beacons) in the control channel where the C-beacons are transmitted periodically. The C-beacon may thus occur in either a distinct logical or physical radio channel. The C-beacon is always transmitted by a Hub device. Furthermore, there may exist multiple control channels and the Hub knows them all.

Additionally, actual data transmissions are carried out in the data channel in which the Hub transmits a data channel beacon (i.e. D-beacon). The D-beacons are also transmitted periodically where the time period between two consecutive D-beacons can be called as an inter-beacon interval (i.e.

IBI). The IBIs in turn can be divided in four distinct parts: Beacon Period, Scheduled Period, Control and Management Period, and Inactive period. The three first Periods are conceptually labeled as active period. The active period commences at the start of Beacon Period and the active period is followed by the inactive period. After the end of the inactive period, a new D-beacon is transmitted at the beginning of a new Beacon Period. Only the Hub is allowed to transmit during the Beacon Period. The difference between the active and inactive periods is that in the active period, the devices, including the Hub, are allowed to transmit or receive over the DCH. The inactive period is specified as a period in time following an active transmission sequence during which the equipment does not transmit or receive over the DCH.

Regarding the definitions of the parts present in the inter-beacon interval, it is possible in another embodiment to define the IBI so that it comprises an inactive period and after the inactive period, an active period will follow. The active period comprises the three distinct parts as mentioned in the previous paragraph. In this regard, the IBI comprises an active period and an inactive period (regardless of their mutual order), and a new beacon is transmitted at the beginning of a new Beacon Period.

According to the present invention and according to the notation used by the inventors currently, the inactive period stands for the portion of the IBI where devices of the network other than the Hub are not allowed to transmit or receive over the channel. This means that the Hub is allowed to transmit and receive even during the inactive period. It can be thus deduced that in case there is a transmission or reception in the inactive period of the IBI, the transmitting or receiving entity must then always be the Hub.

It is notable that this is a slightly broadened interpretation of the inactive period by the inventors compared to the inactive period determined currently in the standard [3].

Summarizing the difference between the active and inactive periods in other words, the active period stands for the portion of the inter-beacon interval (IBI) where devices of the network may transmit data or control frames, as coordinated by the respective network Hub. The inactive period stands for the portion of the IBI where devices of the network other than the Hub are not allowed to transmit or receive over the channel.

The present invention concentrates on a discovery mechanism of a neighbour network where both the discovering network and the network(s) to be discovered are Wireless Body Area Networks (WBANs). In this regard, FIG. 1 shows a flow chart of a first embodiment of the neighbour wireless sensor network discovery process.

At first, a higher layer entity requests a Hub-to-Hub discovery process and this discovery process is initiated in step 101. The Hub of the initiating SmartBAN begins to alternate its inactive period duration in every forthcoming inter-beacon-interval while the active period duration is kept unchanged there. In practice, this can be implemented by toggling between two inactive period durations in every IBI so that the inter-beacon interval duration (TD) changes 102 between two different values. In this phase, parameters i and j are set to 1. Parameter "i" is the running number of the control channel, and parameter "j" is the running number of the inactive periods within the data channel (i.e. also the running number of the IBIs). Next, the algorithm waits for a next inactive period in step 103. At a next step, the Hub initiates a timer 104 and while it is yet to be expired, the Hub scans for control channel (CCH) beacons of other networks during the inactive periods. At first, the control channel "1" is listened, and in case a neighbour Hub C-beacon is discovered 105 in the first inactive period (j=1), this particular neighbouring C-beacon is added to a Neighbour Hub list 106. In case no neighbouring network C-beacon is found during that particular inactive period, the timer is checked 108. In case the timer is still running, the algorithm waits of the next inactive period (j=2) 109, 103 and listens to a possible C-beacon of the control channel "1". This round of steps is continued until the timer expires 108 i.e. the algorithm decides that a necessary number of inactive periods have been used to listen the neighbouring network 1's C-beacons. The algorithm next moves through 110 to a next control channel "2" (i.e. i=2) at step 111 and starts the timer 104, and starts to listen in the first inactive period for the C-beacons transmitted in CCH "2". The C-beacons for control channel "2", which are discovered during any of the inactive periods while the timer is still on, are added to the Neighbour Hub list 106.

This round of process steps is repeated until the predetermined control channel list in step 110 is found exhausted. Alternatively, the algorithm can be stopped if an early termination indication 107 has been issued by the higher layer entity upon step 101 right after an addition has been made to the Neighbour Hub list. A final check can be made with the Neighbour Hub list whether it is empty or whether it includes at least one discovered neighbouring network C-beacon. If the list is totally empty, the algorithm returns a failure message such as "No Hub discovered" to the higher layer entity 114. In case there is discovered one or more neighbouring network C-beacons, and thus, at least one neighbouring WBAN network, the algorithm acknowledges this by returning a "Success" message 113, and outputting the created Neighbour Hub list to the higher layer entity.

Figure 2:
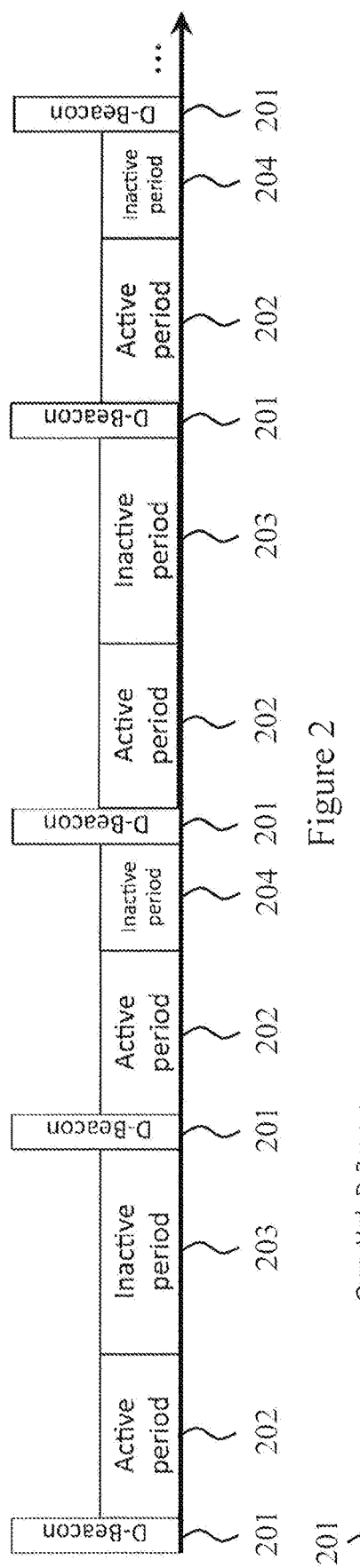
FIG. 2 illustrates an example of alternating the inactive periods of the data channel of the discovering Hub between two predefined values.

FIG. 2 shows the above-mentioned example of alternating the inactive periods 203, 204 of the data channel of the discovering Hub between two predefined values. The active periods 202 right after the D-beacons 201 have mutually the same temporal lengths. As it is shown in the illustrated example, the first and third inactive periods 203 have twice the length of the second and fourth inactive periods 204.

This frame structure is continued further with a similar pattern, and the predefined temporal length of the timer sets up the number "j" of subsequent D-beacons 201 (or IBIs) required in the search.

In general, the D-beacon may occur either in a distinct logical or physical radio channel. There can also be multiple data channels. However, the D-beacon is always transmitted by a Hub device.

Figure 3:
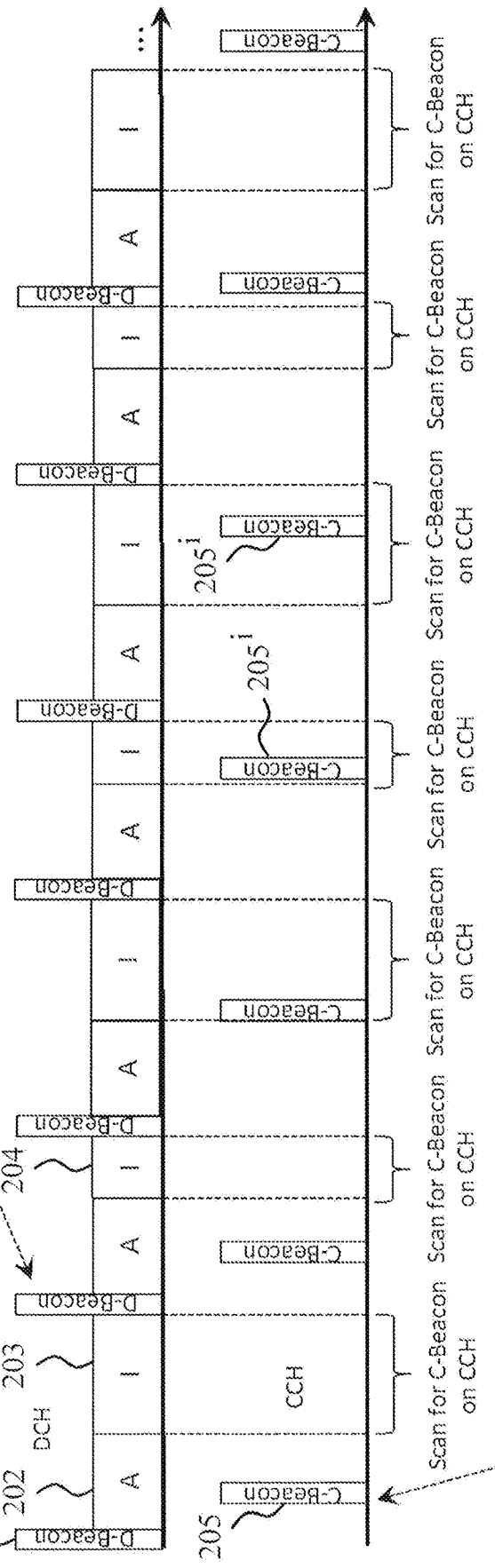
FIG. 3 illustrates the same situation as in FIG. 2, but with an exemplary target Hub present and transmitting control channel beacons in its own right.

FIG. 3 shows the same situation as in FIG. 2 but with an exemplary target Hub present and transmitting control channel beacons 205 in its own right. The upper part of FIG. 3 shows the own Hub data channel similarly as in FIG. 2 with D-beacons 201, active periods 202 (A) and inactive periods 203, 204 (I). Regarding their running order, odd inactive periods 203 have a first temporal length, and even inactive periods 204 have a second temporal length, where the second temporal length is substantially half of the first temporal length in this example.

Now the illustration in the lower part of FIG. 3 shows the control channel of a neighbouring network, called here as a target Hub. The target Hub transmits its C-beacons 205 in a periodical manner, with each beacon interval between the particular C-beacons 205 of the target Hub remaining constant. Still, the algorithm does not know the period between the C-beacons 205 of the target Hub; at least not before the discovery of the network itself. The scanning periods for the C-beacons 205 on the control channel are the inactive periods 203, 204 of the own Hub, marked within the control channel as "Scan for C-Beacon on CCH". As it can be seen in FIG. 3, the first two C-beacons 205 do not locate on the inactive periods 203, 204 of the own Hub (i.e. discovering Hub). The third C-beacon 205 of the control channel of the target Hub locates a bit borderline with the inactive period 203 of the own Hub, but the fourth and the fifth C-beacons 205' undoubtedly locate fully within the respective inactive period 204, 203. The Hub-to-Hub discovery algorithm according to the invention finds this C-beacon 205$^i$ (FIG. 1; 105) and adds it to the Neighbour Hub list (FIG. 1; 106). By alternating the inactive periods 203, 204 of the own Hub between two values, this illustration demonstrates that the C-beacon 205 of the target Hub will be found if the target Hub transmits a periodical C-beacon 205; no matter what is the C-beacon interval of the target Hub. The timer must of course be set to a high enough value that the algorithm won't miss the first instance of the C-beacon 205 within the inactive periods 203, 204 of the discovering Hub.

Of course, a single C-beacon 205$^i$ hit is enough for the algorithm for adding that particular neighbouring C-beacon to a neighbour Hub list 106.

It can be generally stated that alternating the inactive period improves the probability of receiving any periodic C-beacon transmissions as the varying length of the TD disrupts the constant cyclic transmission of D-beacons and shifts the relative occurrence of the inactive period scans with respect to the constant cyclical C-beacon transmissions.

It is notable that FIGS. 2-3 do not present the only possible solution in varying the temporal lengths of the inactive periods. The algorithm works well with other values as well but FIGS. 2-3 suggest one of the less complex implementations according to the present invention.

In another embodiment, the every second inactive period length can be set to have three times the temporal length of the rest of the inactive periods. In other possible embodiments, the coefficient W in equation (1)

$$T_{inactive}^{odd} = W \cdot T_{inactive}^{even} \quad (1)$$

can be any preselected value $\frac{1}{10} \leq W \leq 10$, but $W \neq 1$. $T_{inactive}^{off}$ corresponds to temporal lengths of odd inactive periods 203 and $T_{inactive}^{even}$ corresponds to temporal lengths of even inactive periods 204. In yet further embodiment, the temporal length of odd inactive periods is selected as a very short time period compared to the temporal length of even inactive periods (the latter having a "regular value", such as the length 203 or 204, for instance). Of course, the roles of even and odd inactive periods can be switched with one another with no change to the inventive concept as such.

The discovery algorithm itself is initiated by a higher layer entity of the discovering network. The hub knows the control channel lists but a selection of them to be included in the scan may be provided by the higher layer entity. The possible formats of the C-beacons to be used in the algorithm are known to the Hub.

Summarizing the essence of the present invention, it can be generally stated that alternating the inactive period improves the probability of receiving any periodic C-beacon transmissions as the varying length of the TD disrupts the constant cyclic transmission of D-beacons and shifts the relative occurrence of the inactive period scans with respect to the constant cyclical C-beacon transmissions.

An advantage of the present invention is that the algorithm finds the neighbouring network(s) in a quicker manner compared to the prior art because the IBI duration varies in the present invention. Another crucial advantage is that the present invention allows uninterrupted operations for both the discovering network and the networks to be discovered during the discovery process; meaning that both networks are already operational when the network discovery algorithm is initiated, and the networks remain in completely normal operational state during the discovery process. As a result, no shutdown is required for the discovering network during the algorithm or at the end of the algorithm. One further advantage of the invention is that it is applicable not only to Wireless Body Area Networks, but to all networks and their entities which have a control channel and a known beacon structure where the active and inactive periods alternate (as in the Hub of the WBAN).

The present invention can be implemented as a piece of software in the WBAN system, where the software can be executed in the controller applying the method steps discussed above. The software, i.e. the computer program(s), can be implemented as a single or several computer programs saved in a memory of a device, which is a part of the system. Of course, the software may be stored fully or partly in an external server or in a cloud service from where it can be transferred to be executed by the controller, i.e. processor, of the WBAN system.

The present invention is not restricted to embodiments disclosed above but the invention may vary within the scope of the claims.

The invention claimed is:

1. A method for discovering a neighbouring network by an already operational network, wherein the networks comprise a control channel and a data channel, both comprising a beacon to be transmitted, respectively, channels are predetermined and beacon formats of their control channels are known, and an inter-beacon-interval of the data channel of the already operational network comprises an active period followed by an inactive period, wherein the method further comprises changing the temporal lengths of the inactive periods in the data channel of the already operational network by alternating the temporal lengths of the subsequent inactive periods between two different values as a function of time, where the ratio of the different values is a positive real number, and searching for a beacon of a predetermined control channel of a neighbouring network during subsequent inactive periods of the already operational network.

2. The method according to claim 1, wherein the already operational network and the neighbouring network to be discovered are Wireless Body Area Networks according to IEEE standard 802.15.6 and/or ETSI technical committee SmartBAN specifications.

3. The method according to claim 1, wherein every second inactive period has a doubled temporal duration compared to each individual remaining inactive period.

4. The method according to claim 1, wherein the method further comprises the searching for a beacon of a predetermined control channel is started with a timer, and moving to a next predetermined control channel when a preset value of the timer expires.

5. The method according to claim 1, wherein the method further comprises ending the discovering algorithm when the predetermined control channels have all been processed, or when an early termination command has been given after a control channel beacon of a neighbouring network has already been found.

6. The method according to claim 5, wherein the method further comprises reporting a list of the discovered neighbouring control channel beacons to a higher layer entity after the discovering algorithm has ended.

7. The method according to claim 5, wherein the method further comprises reporting a failure message to a higher layer entity if there are not any discovered neighbouring control channel beacons after the discovering algorithm has ended.

8. A system for discovering a neighbouring network by an already operational network, wherein the networks comprise a control channel and a data channel, both comprising a beacon to be transmitted, respectively,
  channels are predetermined and beacon formats of their control channels are known, and an inter-beacon-interval of the data channel of the already operational network comprises an active period followed by an inactive period,
  wherein the system further comprises
  a processor configured to change the temporal lengths of the inactive periods in the data channel of the already operational network by alternating the temporal lengths of the subsequent inactive periods between two different values as a function of time, where the ratio of the different values is a positive real number, and
  the processor further configured to search for a beacon of a predetermined control channel of a neighbouring network during subsequent inactive periods of the already operational network.

9. The system according to claim 8, wherein the already operational network and the neighbouring network to be discovered are Wireless Body Area Networks according to IEEE standard 802.15.6 and/or ETSI technical committee SmartBAN specifications.

10. The system according to claim 8, wherein every second inactive period has a doubled temporal duration compared to each individual remaining inactive period.

11. The system according to claim 8, wherein the processor is further configured to start the searching for a beacon of a predetermined control channel with a timer, and move to a next predetermined control channel when a preset value of the timer expires.

12. The system according to claim 8, wherein the processor is further configured to end the discovering algorithm when the predetermined control channels have all been processed, or when an early termination command has been given after a control channel beacon of a neighbouring network has already been found.

13. The system according to claim 12, wherein the processor is further configured to report a list of the discovered neighbouring control channel beacons to a higher layer entity after the discovering algorithm has ended.

14. The system according to claim 12, wherein the processor is further configured to report a failure message to a higher layer entity if there are not any discovered neighbouring control channel beacons after the discovering algorithm has ended.

* * * * *